United States Patent [19]

Frick et al.

[11] Patent Number: 5,661,541

[45] Date of Patent: Aug. 26, 1997

[54] PHOTOGRAPHIC COPYING APPARATUS

[75] Inventors: Beat Frick, Buchs; Hansjörg Rotach, Effretikon; Martin Heller, Zürich, all of Switzerland

[73] Assignee: Gretag Imaging AG, Regensdorf, Switzerland

[21] Appl. No.: 528,843

[22] Filed: Sep. 15, 1995

[30] Foreign Application Priority Data

Sep. 15, 1994 [EP] European Pat. Off. .............. 94810535

[51] Int. Cl.$^6$ .......................... G03B 27/46; G03B 27/32
[52] U.S. Cl. .......................................... 355/20; 355/46
[58] Field of Search .......................... 355/20, 40, 46, 355/41, 42, 43

[56] References Cited

U.S. PATENT DOCUMENTS

| 4,742,375 | 5/1988 | Kogane et al. | 355/20 |
| 4,786,944 | 11/1988 | Sakamoto et al. | 355/20 |
| 4,875,071 | 10/1989 | Shiota | 355/20 |
| 4,993,773 | 2/1991 | Shiota et al. | 358/302 |
| 5,036,402 | 7/1991 | Shiota | 358/244 |

FOREIGN PATENT DOCUMENTS

| 0 176 092 | 4/1986 | European Pat. Off. . |
| 0 308 967 | 3/1989 | European Pat. Off. . |
| 37 04 052 | 8/1987 | Germany . |
| 38 20 799 | 12/1988 | Germany . |
| 58-122 529 | 10/1983 | Japan . |
| 63257742 | 2/1989 | Japan . |
| 02 029 728 | 4/1990 | Japan . |

OTHER PUBLICATIONS

Brochure entitled "Masterlab—Retaining your competition edge in photofinishing" by Gretag Imaging, perspectus 98.25.68 BR9402en, 9.93, 10 pages.

*Primary Examiner*—Arthur T. Grimley
*Assistant Examiner*—David A. Lane
*Attorney, Agent, or Firm*—Burns, Doane, Swecker & Mathis, LLP

[57] ABSTRACT

The photographic copying apparatus comprises a first exposure arrangement for exposure of photographic negative and positive copy masters and a second exposure arrangement for exposure of screen copy masters onto photographic copy material. The second exposure arrangement includes a cathode ray tube with control system. The cathode ray tube is arranged at approximately a right angle with respect to the exposure light path of the first exposure arrangement. The second exposure arrangement further comprises a color filter assembly, an objective and a mirror for directing the screen copy master emitted by the cathode ray tube to the photographic copy material. The color filter assembly, the objective and the mirror are combined as a structural unit to constitute an imaging optical system, which can be positioned into the exposure light path instead of an reproduction objective of the first exposure arrangement.

10 Claims, 9 Drawing Sheets

PHOTOGRAPHIC COPYING APPARATUS

BACKGROUND OF THE INVENTION

The invention relates to a photographic copying arrangement, in particular, a photographic multipurpose copying apparatus which can, at will, produce exposures of photographic negative or positive copy masters and/or screen copy masters generated by a cathode ray tube (CRT) onto photographic copy material.

In the photofinishing industry of today, along with prints from negative or positive film material, prints must frequently be produced from images stored on electronic media. These can be images from video film or from a so-called "Still Video" system. Even in conventional photography, with positive or negative film, a current trend is to transfer the pictures from the film to an electronic storage medium, making it possible to reproduce images on a TV or a monitor connected to electronic data processing equipment. Special data processing equipment routines may then be used to artistically alter the images, for example, for use in presentations. Early on, devices became known which made it possible to present prints from images on a VDU (Video Display Unit) screen.

Due to the desire to be able to expose negative or positive copy masters and/or screen images onto photographic copy material all in a single device, photographic multipurpose copiers were developed such as the copier disclosed in U.S. Pat. No. 4,742,375. The photographic multipurpose copier of U.S. Pat. No. 4,742,375 is equipped with a conventional exposure arrangement for negative or positive films, and is also equipped with a more advanced exposure arrangement by which VDU screen images can be exposed onto photographic paper. The supplementary exposure arrangement includes a cathode ray tube (hereinafter abbreviated with CRT), a special imaging optical system and adapted filters so as to make it possible to execute the needed exposures for a color print in the three primary colors blue, green and red.

Embodiment variations of this kind of combined equipment have been attempted. In the most expedient and space-saving variant, the CRT is positioned facing the exposure light path at a 90° angle relative to the conventional exposure configuration. The light from the CRT is lead through an accompanying objective and filter and then, by means of a flip-on mirror, the light is directed to the photographic paper. The CRT, the objective, the filter and the flip-on mirror are fastened in the appropriate positions inside the device, and must be adjusted precisely in relation to one another and to the segment of photographic paper being exposed, so that the image pattern projected from the CRT can be exposed onto the photographic paper sharply and in compliance with the desired enlargement size.

While factory-prepared combination equipment can be adjusted by technical personnel in the factory to obtain a proper alignment, using special equipment, this adjustment is relatively hard for service personnel at the assembly site to perform. A subsequent adjustment might become necessary, for example, based on displacements occurring during transport. In addition, many photo laboratories would like to see their existing conventional copying equipment enhanced and fitted with an exposure arrangement for screen copy masters. Needless to say, the equipment is not returned to the manufacturer for this purpose. Rather the copying equipment is rebuilt at the assembly site. For that reason, an overhaul of this type must take place very quickly, so that the equipment can be put back into working order as soon as possible. In the case of the well-known combination equipment, however, all the optical element groups of the additional contact printer configuration must be separately installed and be adjusted accordingly. This is a time-consuming process and involves relatively long down-time of the copier equipment, during which time it is not available for making prints.

Another problem with the known combination equipment configuration lies in the fact that the single optical element groups are arranged in a rather unprotected manner inside the device. For this reason, they can get dusty rather easily, requiring frequent cleaning of the construction groups. As a result of the separate and relatively unprotected configuration of the optical construction components in the supplementary exposure configuration, them is also the danger that extraneous light will enter or escape, particularly aberrant light or stray light, which can have a very negative effect upon the making of prints.

SUMMARY OF THE INVENTION

The present invention provides an improved combination device of this type which greatly reduces the drawbacks described above. The photographic combination copying apparatus according to the present invention exhibits a simple structure that permits the additional exposure arrangement to be maintained both at the factory and at the client site, without creating an undue overhead in terms of technical expertise required and consumption of time. The optical construction groups of the supplementary exposure arrangement, e.g. color filters mirror, and objective, are arranged in such a way that stray light and aberrant light are extensively avoided, and that the danger of dust build-up or dirt accumulation within the optical construction groups is reduced.

The photographic copying apparatus according to the present invention is designed as a combination copying apparatus, and includes a first exposure arrangement with a reproduction objective for the exposure of photographic negative or positive copy masters and a second exposure arrangement for the exposure of screen copy masters onto photographic copy material. The second exposure arrangement includes a CRT and a control system for this CRT. The CRT is arranged at approximately a right angle with respect to the exposure light path defined by the first exposure arrangement. The second exposure arrangement further comprises a color filter assembly, a objective and a mirror for directing the screen copy master emitted by the CRT towards the photographic copy material. According to the present invention, the color filter assembly, the objective and the mirror are combined as a structural unit to constitute an imaging optical system, which is capable of being positioned into the exposure light path, alternatively, instead of the reproduction objective of the first exposure arrangement.

In the present invention, the configuration and design of the color filter assembly, the objective and the mirror as a structural unit results in a compact component that can be moved as a whole into the exposure light path. Separated from the copying apparatus the color filter assembly, the objective and the mirror can be assembled and can be adjusted relative to each other. Only the assembled and previously adjusted component is then installed in the copying apparatus as a compact imaging optical system for the CRT. Compared with the state-of-the-art device, the apparatus according to the present invention has the considerable advantage that the imaging optical system for the CRT can be produced in advance, independently of the copying apparatus. For example the copying apparatus first can be equipped with the CRT together with the required control system, and afterwards the previously adjusted and prepared imaging optical system can simply be installed in the apparatus in the position provided for it. In this manner, the expenditure of time and technical expertise required for the installation of a combination apparatus of this kind can be considerably reduced. The configuration of the imaging optical system according to the present invention is particularly advantageous for the conversion of a conventional photographic copying apparatus which is already on hand in the photo lab. Since the color filter assembly, the objective and the mirror are available and mountable as an integrated, pre-adjusted structural unit, the conversion time and with it the downtime of the copying apparatus is reduced. Existing devices can be upgraded in this manner without limiting their existing functions.

Since fie sensitive optical components, namely the color filter assembly, the objective and the mirror, are formed as a structural unit, stray light and aberrant light can effectively be neutralized. Given the fact that the optical components are put together to an compact, pre-adjusted imaging optical system, they can also be more simply and effectively protected against dust and dirt build-up.

BRIEF DESCRIPTION OF THE DRAWINGS

The invention will be described in greater detail with reference to the accompanying drawings in which like elements bear like reference numerals, and wherein:

FIG. 3 is a cross-sectional side view of the photographic copying apparatus according to FIG. 1, with the second exposure arrangement flipped-in;

DETAILED DESCRIPTION OF THE PREFERRED EMBODIMENTS

Figure 1:
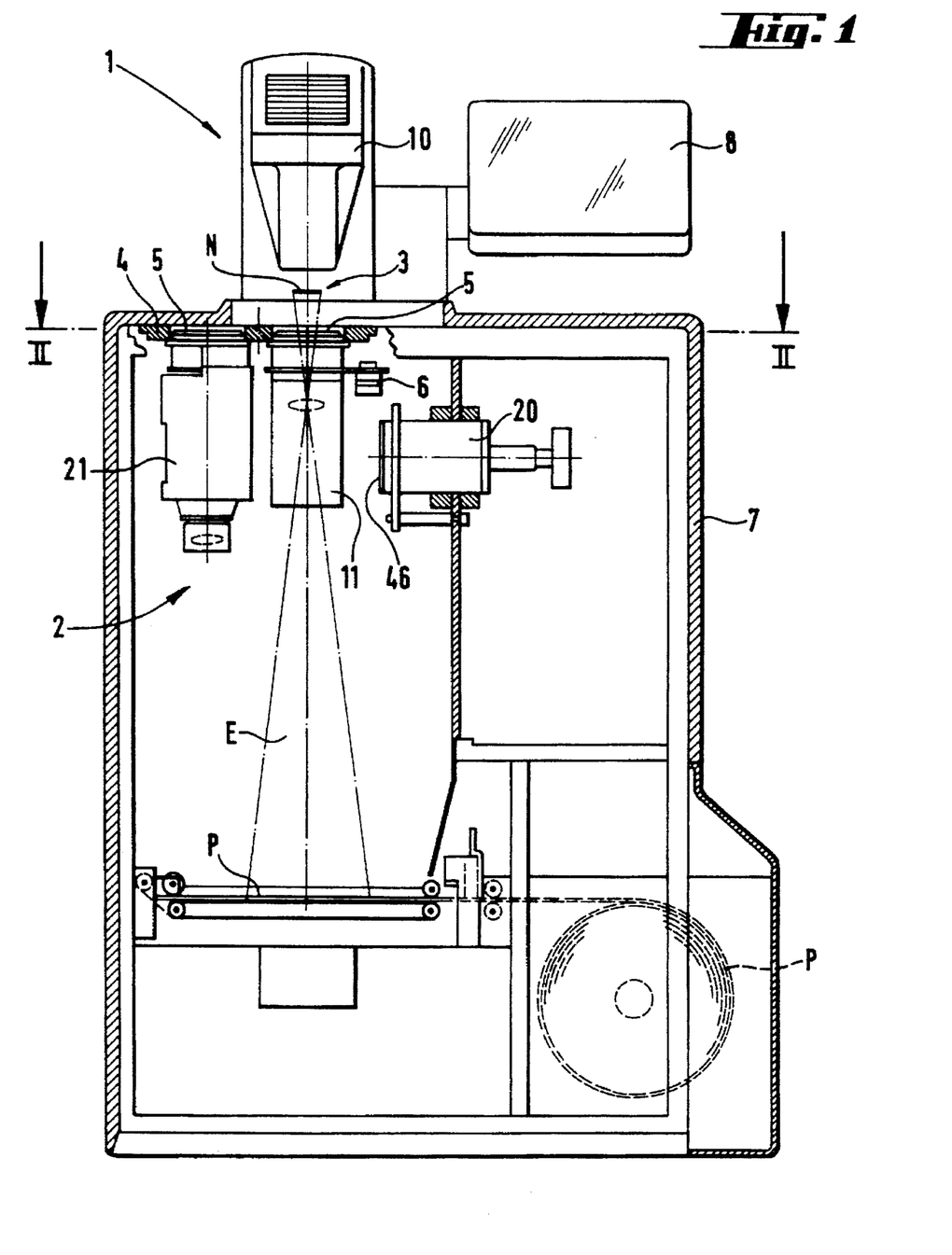
FIG. 1 is a cross-sectional side view of a photographic copying apparatus according to the present invention.
Figure 2:
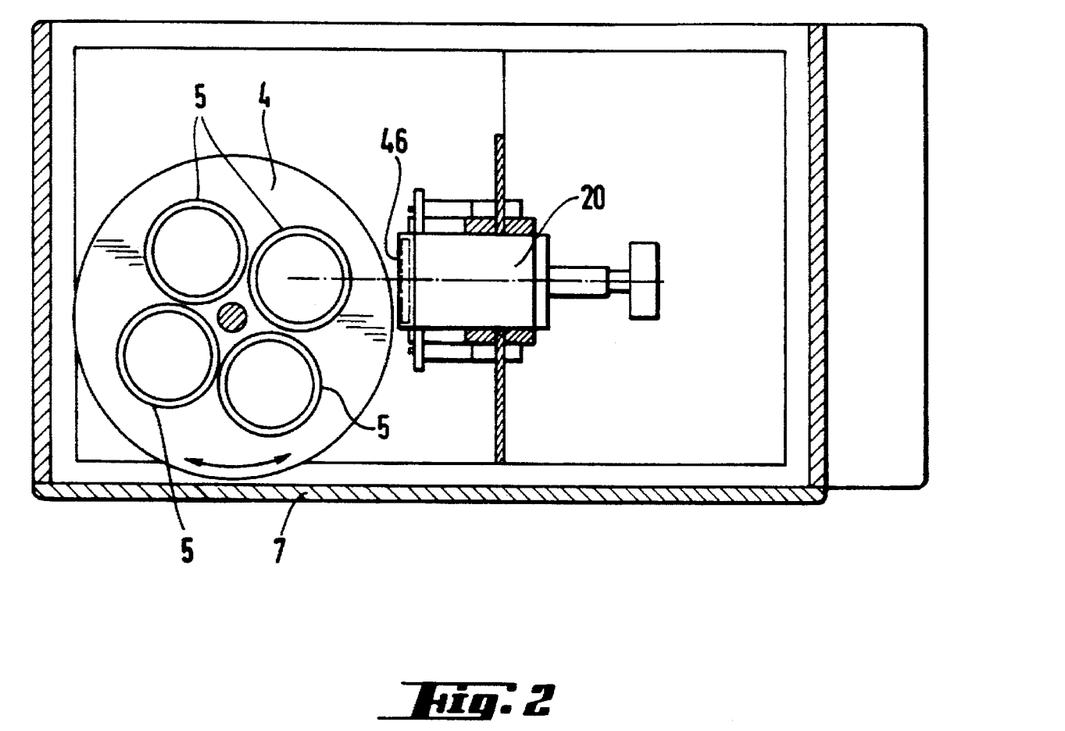
FIG. 2 is a cross-section of the photographic copying apparatus taken along section line II—II of FIG. 1.
Figure 3:
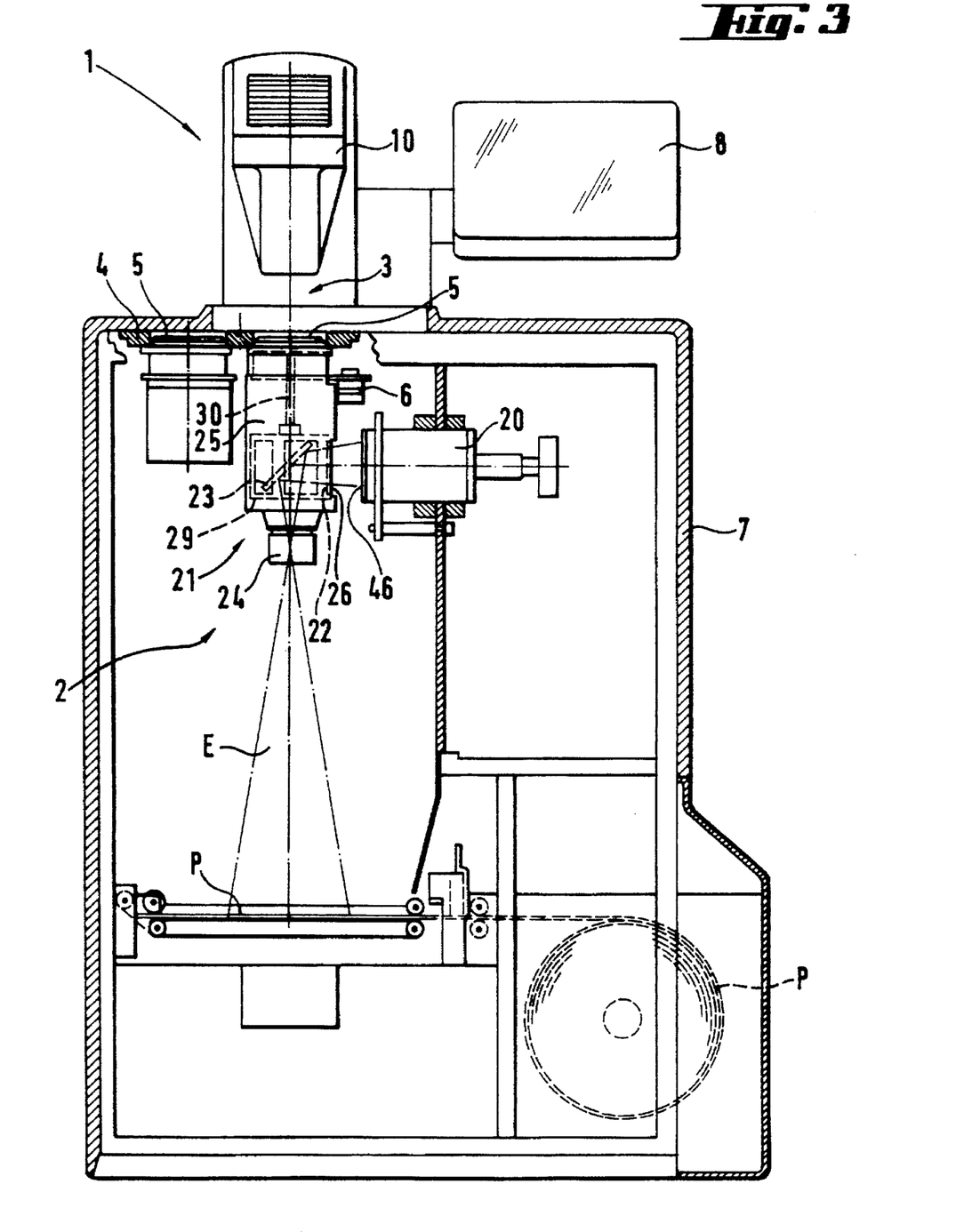

The photographic copying apparatus which is shown as an example in FIGS. 1–3 corresponds in many features to the device which is called "MASTERLAB" and which is described in a prospectus 98.25.68 BR9402en of the firm Gretag Imaging. The disclosure of this prospectus is incorporated herein by reference. Therefore, the following description of the photographic copying apparatus deals only with those details which are essential for the understanding of the present invention.

As can be seen in FIGS. 1–3, the photographic copying apparatus comprises a housing 7, on which a control console 8 and a lamp housing 10 are mounted. The lamp housing 10 includes an exposure lamp (not shown). A film carrier 3 is arranged on the top side of the housing 7 below the lamp housing 10 for the purpose of accommodating and manually or automatically transporting the copy masters N, e.g. negative or positive copy masters. The photographic copy material P which is preferably photographic paper is arranged inside the housing 7, onto which the copy masters N are exposed.

The photographic copying apparatus, represented by way of example in FIGS. 1–3, is a multi-purpose copying apparatus which is designed both for exposures of conventional negative or positive copy masters (e.g. 135 mm print or slide film), as well as for exposures of screen copy masters. For this purpose, the photographic copying apparatus is equipped with two exposure arrangements 1, 2. The first exposure arrangement 1 comprises in addition to the exposure lamp positioned in the lamp housing 10 at least one reproduction objective 11, by which a copy master is exposed in the desired imaging scale onto the photographic copy material P provided into the exposure light path E. The reproduction objective 11 is, for example, a zoom objective whose focal length can be adjusted with the help of a zoom drive mechanism 6, in order to focus to the desired imaging scale. Additional reproduction objectives can be provided, for example, fixed focus and/or other zoom objectives which can be mounted on insertion spots 5 of a objective carousel 4 shown in FIG. 2. A change of objective takes place easily with a manual or automatic rotation of the objective carousel 4.

The second exposure arrangement 2 includes a cathode ray tube (CRT) 20 with a screen 46 on which the screen copy master, that has to be exposed onto the copy material P, is generated, and a control system (not shown) for the CRT 20. The CRT 20 is arranged at approximately a right angle with respect to the exposure light path E of the first exposure arrangement 1. The second exposure arrangement 2 further includes an objective 24, a mirror 23 and a color filter assembly 22, which comprises color filters for the primary colors red, green and blue. The light emitted by the monochromatic screen 46 of the CRT 20 and therewith the screen copy master passes through the color filter assembly 22 to generate the needed quantities of copying light in the three primary colors blue, red, green, and with the help of a mirror 23 is then directed into the exposure light path E. The objective 24 projects the screen copy master onto the photographic copy material P.

As indicated in FIGS. 1 and 3, and shown in detail in FIGS. 4, 5 and 7, 8, respectively, according to the present invention the color filter assembly 22, the mirror 23 and the objective 24 of the second exposure arrangement 2 are combined as a structural unit to constitute an imaging optical system 21. This imaging optical system 21 is capable of being positioned into the exposure light path E instead of the conventional reproduction objective 11, in order thus to project a screen copy master generated by the CRT 20 onto the photographic copy material P.

Figure 4:
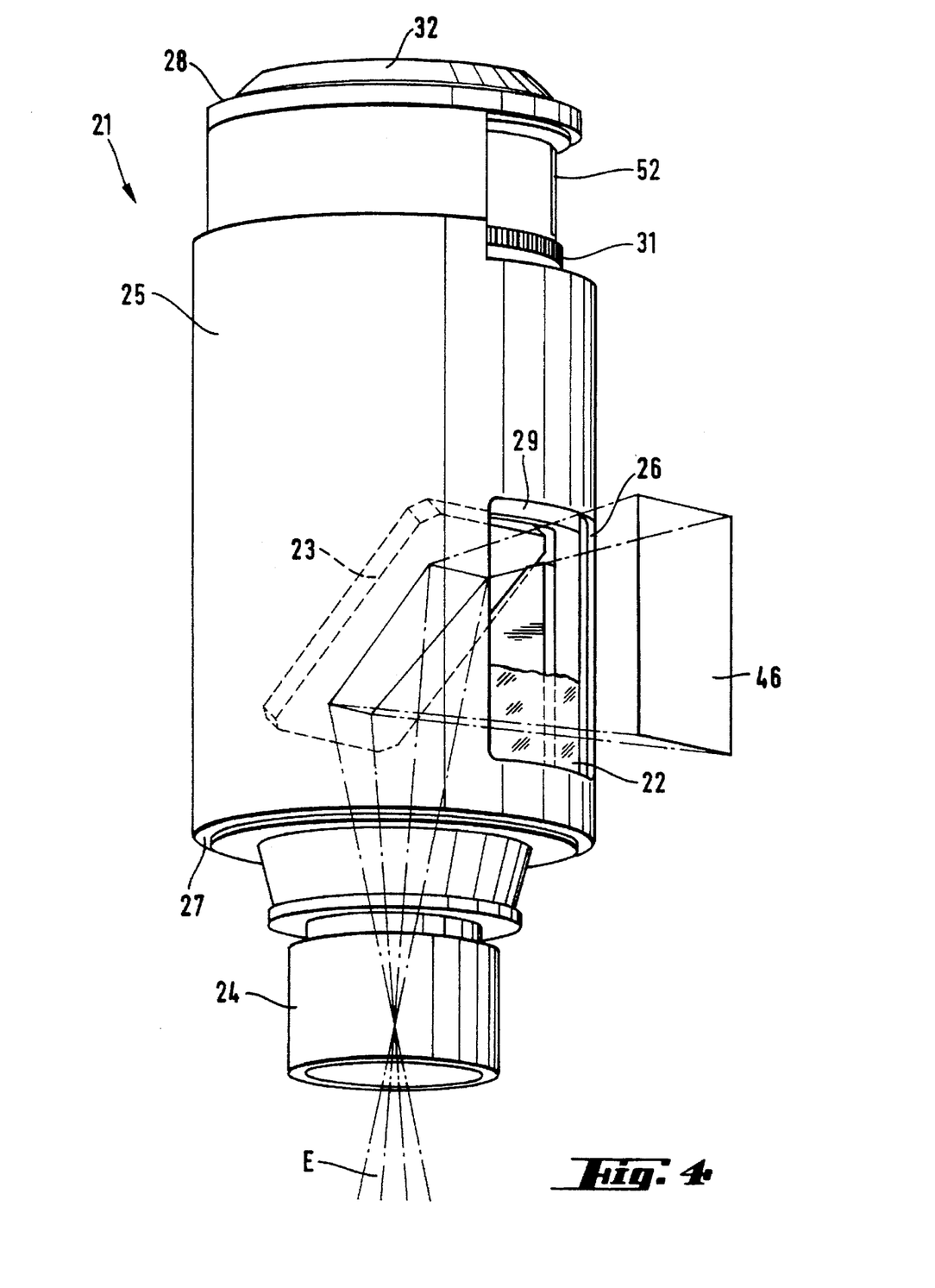
FIG. 4 is a perspective view of a first embodiment of the imaging optical system of the second exposure arrangement according to the invention.
Figure 5:
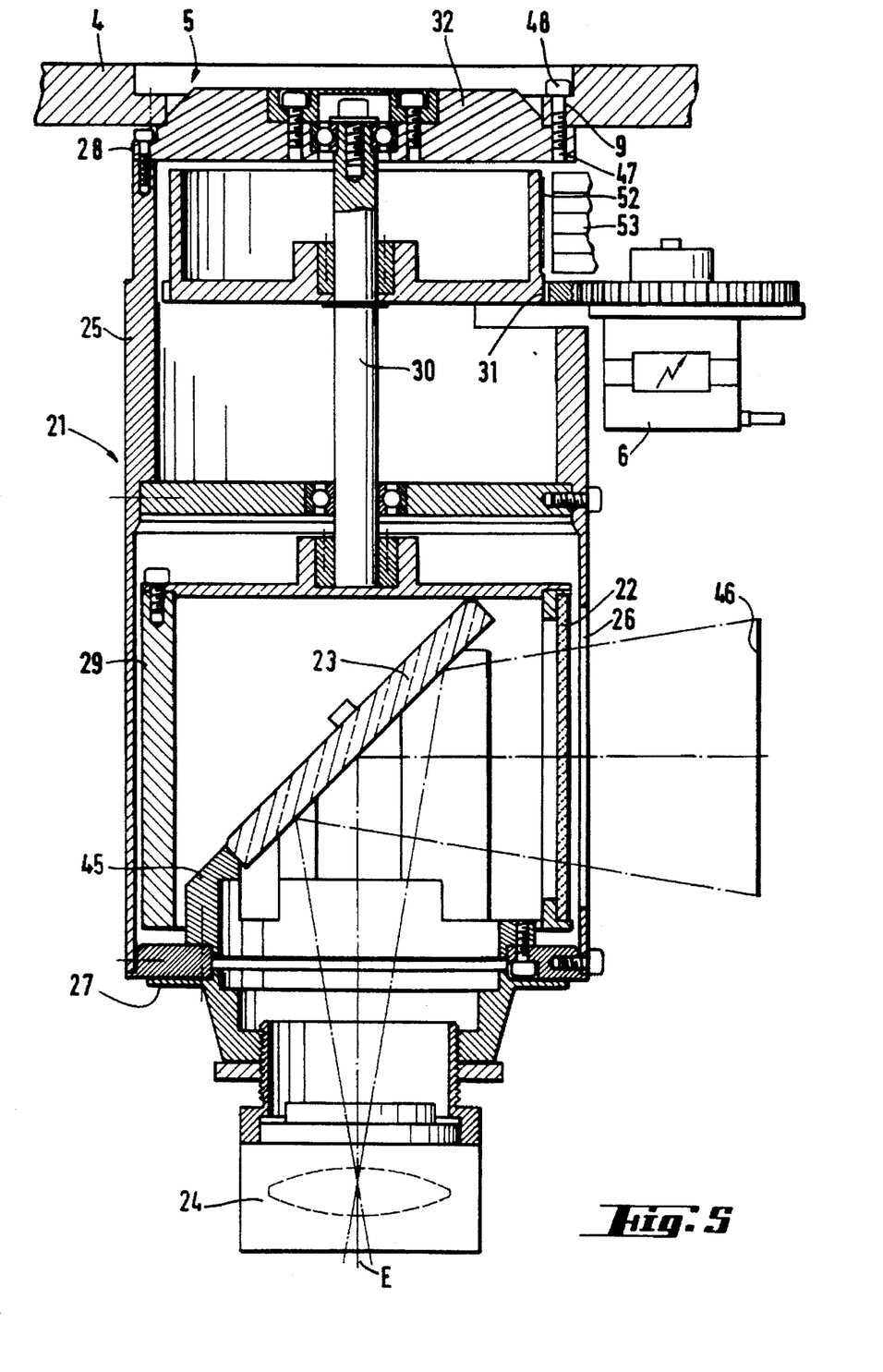
FIG. 5 is a cross-sectional view of the imaging optical system of FIG. 4.

The imaging optical system 21 shown in FIGS. 4 and 5 has a light-tight, preferably cylindrical tubus 25 in the casing of which an approximately rectangular light-entry window 26 is provided. At one lower end 27 of the tubus 25 the objective 24 is mounted. As shown e.g. in FIG. 5, the mirror 23 is affixed inside the tubus 25 on a mirror console 4, 5, which is firmly connected with the tubus 25. The mirror 23 is mounted fixedly relative to the light-entry window 26 and is positioned at about a 45° angle relative to the axis of the tubus 25, in order to divert the light coming from the screen 46 of the CRT 20 about approximately 90 in direction to the objective 24. The color filter assembly 22 is provided between the light-entry window 26 and the mirror 23. In this manner the color filter assembly 22, the mirror 23 and the objective 24 are in a fixed, preadjusted relationship to one another, and can be brought as a whole into the exposure light path E. In this operating position the light-entry window 26 of the tubus 25 faces the screen 46 of the CRT 20, and is positioned as closely as possible to it, in order to avoid the entry of stray light, and to capture as much emitted light as possible from the screen 46. For purposes of better clarity, additional light seals between the screen 46 and the tubus 25 are not shown.

In a preferred embodiment of the present invention, the color filters of the color filter assembly 22 are arranged on the circumference of a filter cage 29, that is rotatable within the tubus 25. The filter cage 29 further comprises on its circumference an area, which blocks the light pass-through when facing the light-entry window 26 and an additional area which, when facing the light-entry window 26, allows light from the CRT 20 to pass unhindered through the light-entry window 26 towards the mirror 23. In this manner, the filtration of the light for the exposure in the three primary colors red, green, blue is a very simple matter and occurs by merely rotating the filter cage 29. The two supplementary positions of the filter cage 29, in which light can pass unhindered or be completely blocked, serve to allow for calibration of the device. As can be seen from FIG. 5, the filter cage 29 is affixed to a cage shaft 30 which extends axially to that end 28 of the tubus 25 which is averted to the objective side of the of the imaging optical system 21. At the end 28 of the tubus 25 the cage shaft 30 is mounted in a centering device 32, which closes the tubus 25. The centering device 32 is provided with through-bores 47, which together with corresponding through-bores 9 in the objective carousel 4 are used to attach (e.g., using screws 48) the imaging optical system 21 to the corresponding insertion spot 5 of the objective carousel 4.

As shown e.g. in FIG. 6, in a preferred embodiment of the present invention a gear-wheel 31 is fixedly attached to the cage shaft 30 below the centering device 32. The gear-wheel 31 is in mesh with the zoom drive mechanism 6 when the imaging optical system 21 is in operating position. By this means it is not necessary to provide an additional drive for the filter cage 29, but the already present zoom drive mechanism 6 in the device is used to rotate the filter cage 29 in order to adjust the desired filter position needed for the exposure in the three primary colors green red and blue.

Figure 6:
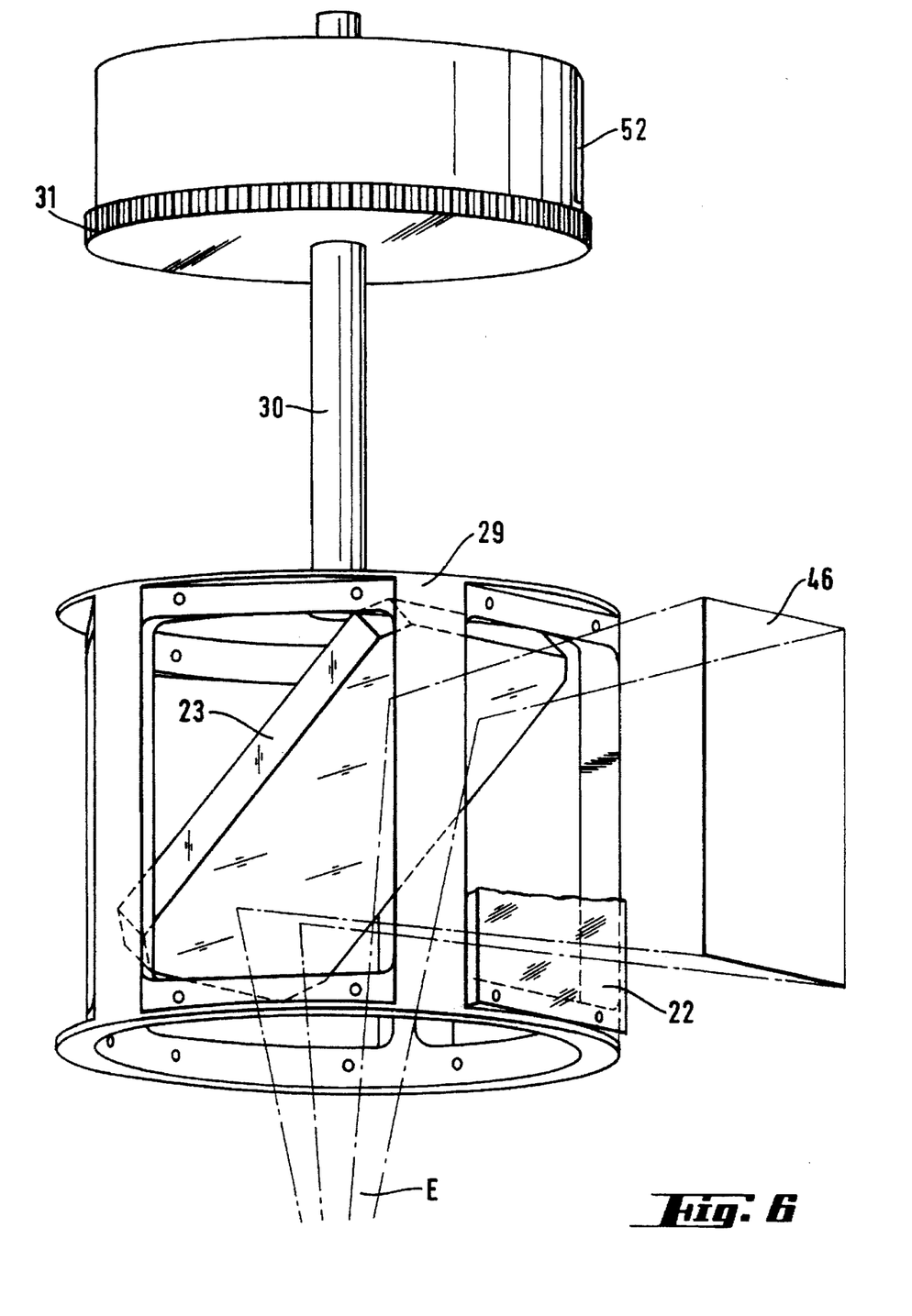
FIG. 6 is a perspective view of a filter cage with cage shaft and drive gear-wheel.

The filter cage 29, shown separately in FIG. 6, has approximately the form of a cylindrical casing which preferably is provided with five equally spaced windows arranged along the circumference. The windows, shown in FIG. 6, are all represented by openings. In one of the openings one of the color filters is partially indicated. However, it must be understood that the required color filters are inserted in three of the windows, while one window is blocked by an opaque element. One of the five windows remains unoccupied, or alternatively is occupied by a transparent, colorless element, and allows light to pass through unhindered towards the mirror 23 arranged behind it. The mirror 23 is indicated in FIG. 6. The arrangement of the mirror 23 is such that light emitted from the screen 46 of the CRT 20 hits the mirror 23 and is diverted about 90° in the direction of the filter cage's 29 open bottom end at the objective side. The filter cage's 29 other end is fixedly attached to the cage shaft 30, on whose top end the gear-wheel 31 is attached. The gear-wheel 31 can be brought in mesh with the zoom drive mechanism 6. The filter cage 29 is dimensioned in such a way that it can be rotated without hindrance caused by the mirror 23 or the tubus 25.

Figure 7:
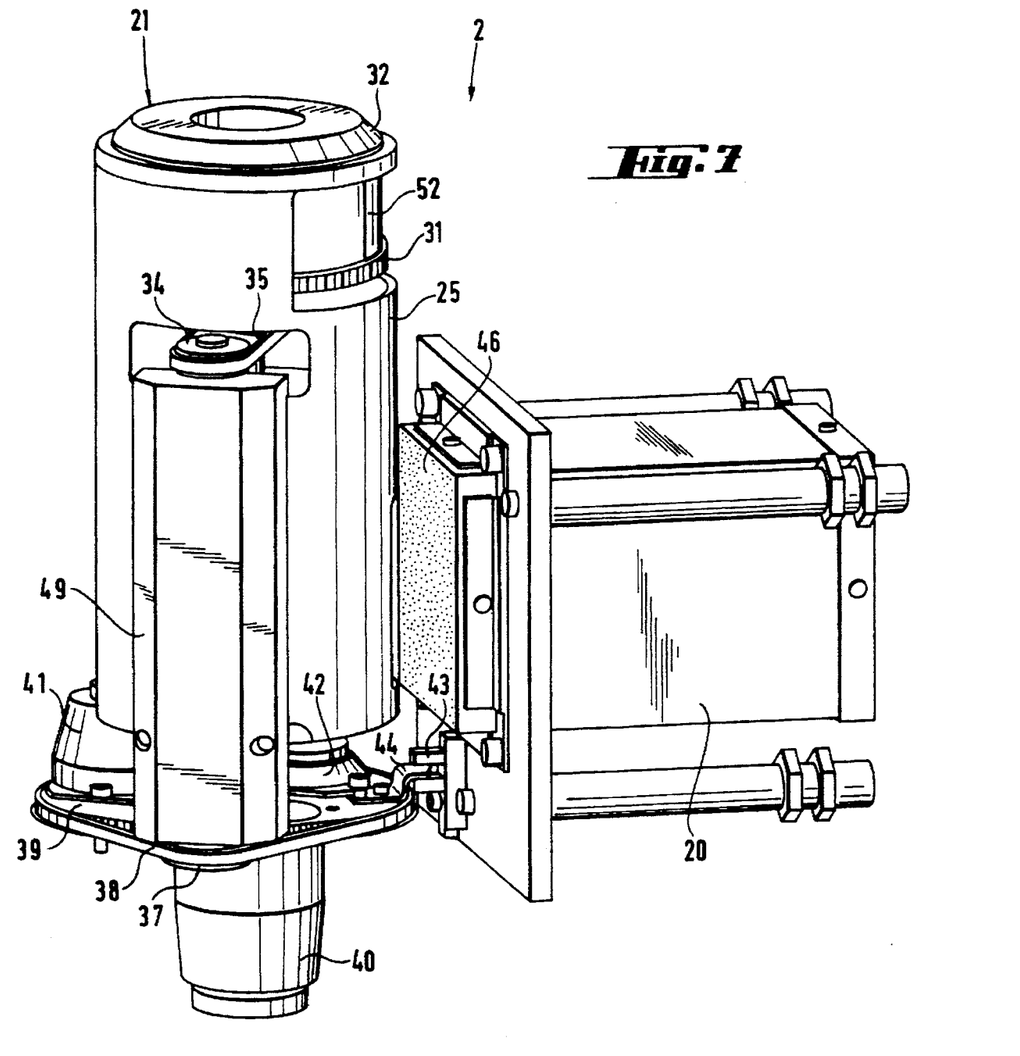
FIG. 7 is a perspective view of a second embodiment of the imaging optical system according to the invention together with the CRT.
Figure 8:
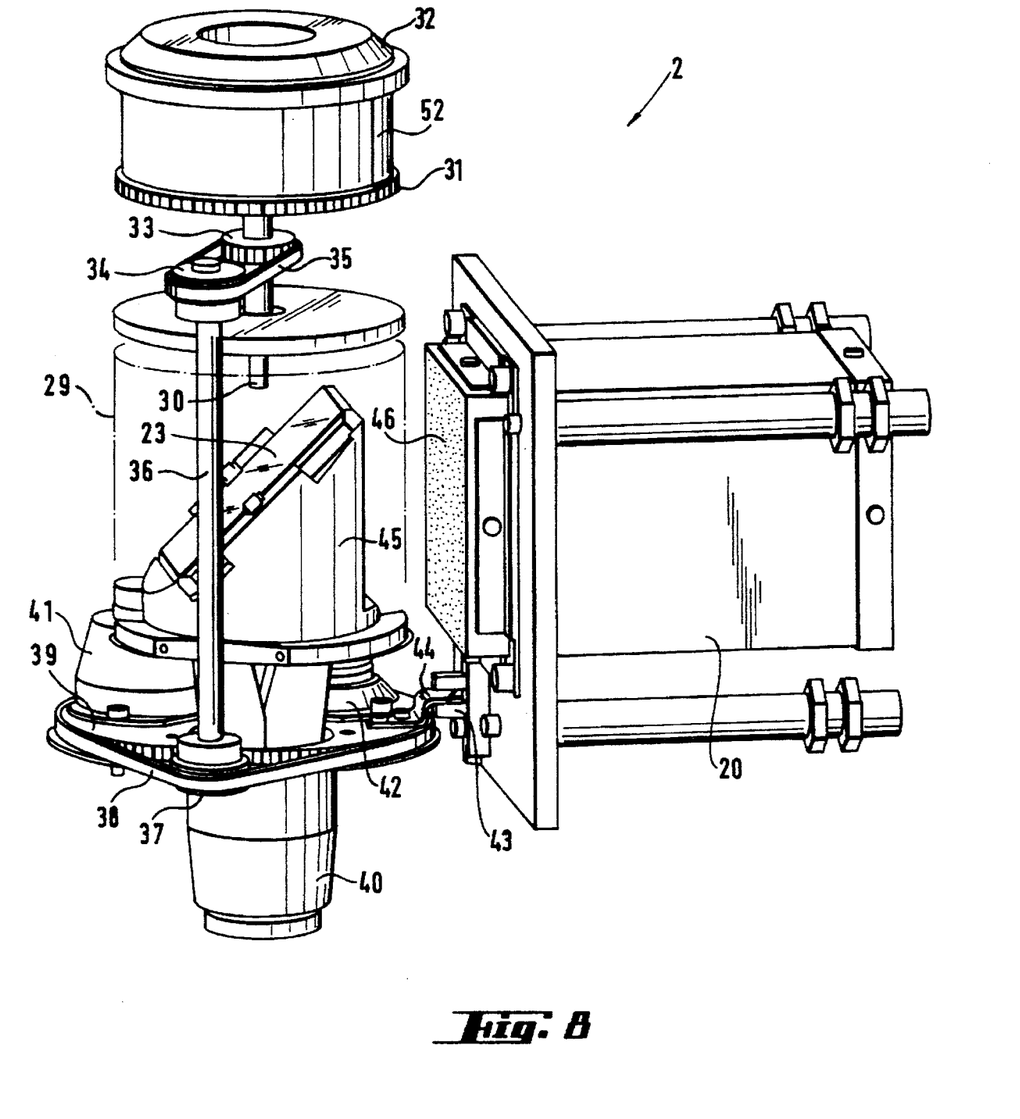
FIG. 8 is a perspective view of the imaging optical system according to FIG. 7, in which the tubus is omitted and the filter cage is only indicated virtually.
Figure 9:
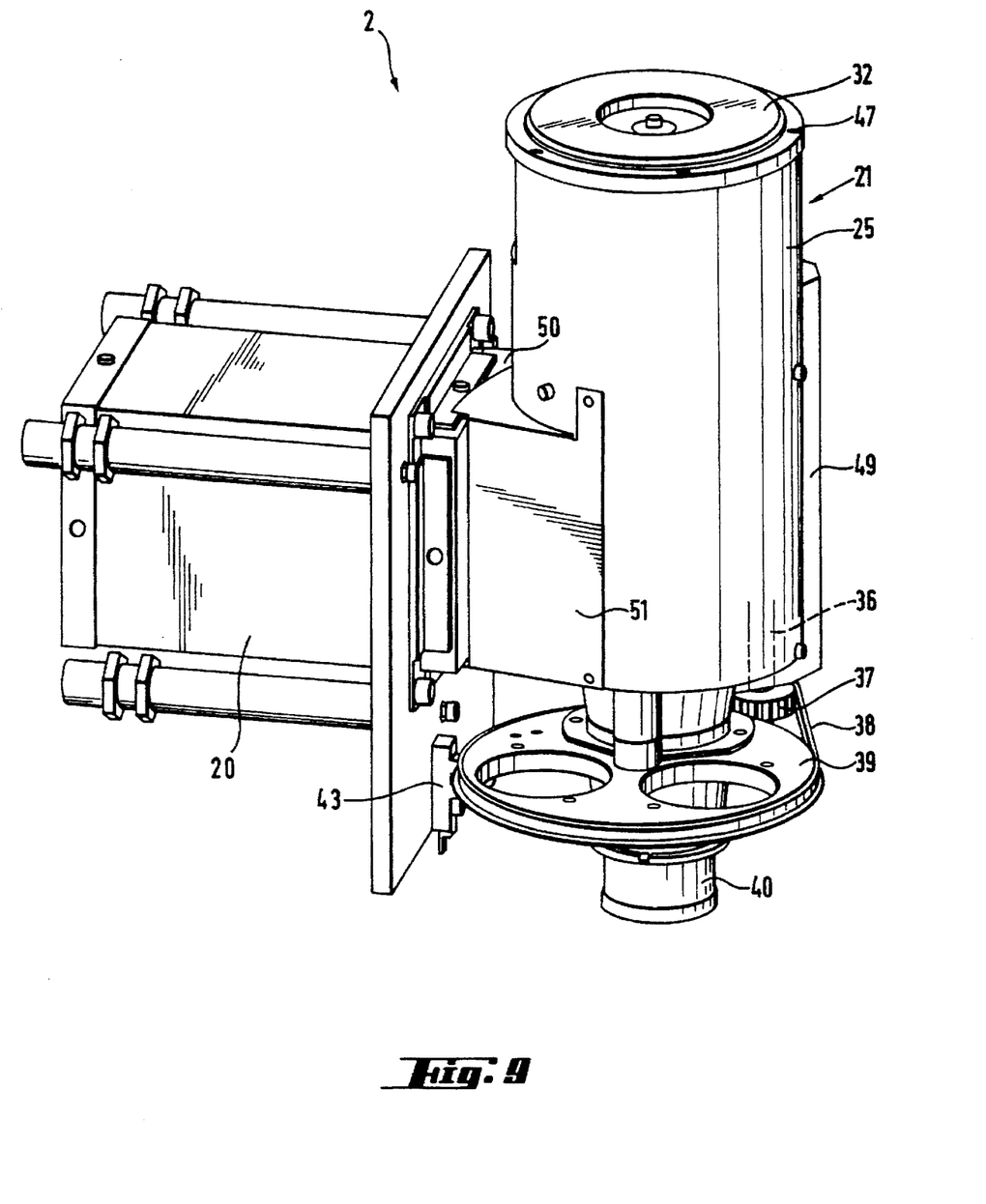
FIG. 9 is a perspective view of the imaging optical system according to FIG. 7 from the opposite side.

In FIG. 7–9 a second embodiment of the imaging optical system 21 for the second exposure arrangement 2 with CRT 20 is shown. This second embodiment is different from the embodiment shown in FIGS. 4 and 5 in that, instead of a single objective with a fixed focal length, a platter-like objective carrier 39 is provided which is capable of accommodating a series of objectives, e.g. three objectives 40, 41, 42, with different focal lengths. The objectives may be changed for the adjustment of different imaging scales simply by rotating the platter-like objective carrier 39 with the help of an objective carrier adjustment drive.

In an particularly preferred variant of embodiment of the integrated imaging optical system 21, the rotation of the platter-like objective carrier 39 is coupled with the rotation of the filter cage 29, that means the filter cage drive mechanism and the objective carrier adjustment drive are coupled to one another. The coupling is realized such, that a rotation of the filter cage 29 in a first direction causes an adjustment of the platter-like objective carrier 39 and thereby causes a change of objectives, while a rotation of the filter cage 29 in a second direction opposite the first direction causes an uncoupling of the filter cage 29 from the platter-like objective carder 39, such that the position of the platter-like objective carder 39 does not change. To this end, as it is shown in FIG. 8 (in which, for purposes of clarity, the filter cage 29 is only indicated virtually), a freewheeling toothed wheel 33 is provided below the drive gear-wheel 31 for the cage shaft 30. This freewheeling toothed wheel 33 is connected via a first toothed belt 35 with a first toothed disk 34, which sits on a lateral drive shaft 36. The lateral drive shaft 36 extends parallel to the axis of the cage shaft 30 in the direction of the objective carder 39 and is connected at its end adjacent to the objective carrier with a second toothed disk 37. A second toothed belt 38 joins this second toothed disk 37 to the platter-like objective carrier 39.

A turning of the drive gear-wheel 31 in one direction is transmitted to the freewheeling toothed wheel 33. The rotation of this toothed wheel 33 is transmitted to the lateral drive shaft 36 via the first toothed belt 35 and the first toothed disk 34. The second toothed disk 37 located adjacent to the platter-like objective carrier 39 is fixedly attached to the drive shaft 36 and transmits the rotation of the lateral drive shaft 36 to the objective carrier 39 with the help of the second toothed disk 38. By this, the platter-like objective carrier 39 is placed into the desired position in order to position the appropriate objective with the required focal length into the exposure light path E. The position of the platter-like objective carrier 39 is controlled by means of a photoelectric sensing device having a fork 43 which is located, for example, beneath the screen 46 of the CRT 20 and a flag 44 attached to the objective carrier 39 and working together with the fork 43 in any known manner. The filter cage 29, which rotates during the objective adjustment, must be brought once again into the desired position before the next exposure. For that purpose a reflecting mark 52 is provided on the gear-wheel 31 whose position is detected with the help of a photoelectric detector 53 (shown in FIG. 5). Preferably, the reflecting mark 52 is attached in such a way that, when the reflecting mark 52 is detected, the light path is completely blocked.

When the drive gear-wheel 31, which is fixedly attached to the cage shaft 30, is driven in the opposite direction, the freewheeling of the toothed wheel 33 below comes into play. Therefore, the cage shaft rotation is not transmitted to the lateral drive shaft 36 and the platter-like objective carrier 39, respectively. In this manner the filter cage 29 can be rotated in the usual way in order to calibrate the device and to perform the exposures in the three primary blue green and red. As shown in FIG. 7, the lateral drive shaft 36 with the two toothed discs 34, 37 is arranged in a shaft housing 49 which is fastened to the tubus 25 by any known fastening means.

The coupling of the turning of the platter-like objective carrier 39 with the rotation of the filter cage 29 makes it possible to use the same drive mechanism both for the rotation of the filter cage 29 and for the adjustment of the platter-like objective carrier 39. In a particularly preferred embodiment, the adjustment of the different objectives 40, 41, 42 with different focal lengths, which are arranged on the platter-like objective carder 39 that is located at one end of the tubus 25, is also performed with the zoom drive mechanism 6. Since there is already provided within the copying apparatus the zoom drive mechanism 6 for adjusting the focal length of conventional zoom objectives 11, no additional adjustment drive mechanism is necessary.

As indicated in FIG. 9, a light seal 50, 51 may be provided between the screen 46 and the tubus 25, in order to completely avoid the incidence of stray light. In the embodiment shown in FIG. 9, the light seal includes a screen-side part 50 and a tubus-side part 51. When the imaging optical system 21 of the second exposure arrangement 2 is in its operating position, these two parts 50, 51 lie against one another in such away that the incidence of stray light is effectively avoided.

By building up the imaging optical system 21 of the second exposure arrangement 2 including the CRT 20 according to the present invention, already existing equipment features of the photographic copying apparatus can be optimally used for the implementation of additional elements. For operating the color filter assembly 22 in the supplementary imaging optical system 21, no additional drive is necessary. The same drive mechanism 6 can also be used for the adjustment of the desired objective at the imaging optical system 21. The arrangement and configuration of the color filter assembly, the objective and the mirror as a structural unit according to the present invention, results in a compact imaging optical system, which approximately exhibits the form and the dimensions of a conventional zoom objective, and which can be brought into the exposure light path E as a whole. Separated from the copying apparatus the color filter assembly, the objective and the mirror can be assembled and can be adjusted relative to each other. Only the assembled and previously adjusted component is then installed in the copying apparatus as a compact imaging optical system for the CRT. Compared with the state-of-the-art device, the apparatus according to the present invention has the considerable advantage that the imaging optical system for the CRT can be produced in advance, independently of the copying apparatus. For example the copying apparatus first can be equipped with the preadjusted mounting device or with the CRT, and afterwards the preadjusted and prepared imaging optical system and, if need be, the CRT can simply be installed in the apparatus in the position provided for them. In this manner, the expenditure of time and technical expertise required for the installation of a combination apparatus of this kind can be considerably reduced. The configuration of the imaging optical system according to the present invention is particularly advantageous for the conversion of a conventional photographic copying apparatus which is already on hand in the photo lab. Since the color filter assembly, the objective and the mirror are available and mountable as an integrated, pre-adjusted structural unit, the conversion time and with it the downtime of the copying apparatus is reduced. Existing devices can be upgraded in this manner without limiting their existing functions.

The compact arrangement of the optical elements of the second exposure arrangement as an imaging optical system, which has the dimensions of a conventional zoom objective, makes it possible to mount this imaging optical system together with other conventional reproduction objectives on an known objective carousel. To change the objective, this carousel is rotated manually or automatically. It is advantageous, when an automatic change between the corresponding first or second exposure arrangement is provided to automatically switch over from the conventional light source to the CRT, if a conventional reproduction objective of the first exposure arrangement is interchanged with the imaging optical system of the second exposure arrangement, and vice versa. Thereby, faulty operations which could result in a damage to the copying apparatus can be avoided.

The compact configuration of the imaging optical system of the present invention makes it possible to effectively eliminate stray light and aberrant light. Since the optical components form a single, compact, pre-adjusted imaging optical system, they also can be protected against dust and dirt build-up in an easier and more effective manner.

A preferred embodiment of the photographic copying apparatus is a compact photo lab, which in addition is provided with a film opening and splicing module, a film developing module, a paper developing module, and a paper-cutting and photo-outputting module. In such a manner a versatile multi-purpose apparatus is provided which integrates the film and paper processors in a very small space, and makes possible on demand the operation as a conventional lab with negative or positive copy masters and/or an operation wherein screen copy masters can be exposed onto photographic copy material.

While the invention has been described in detail with reference to preferred embodiments thereof, it will be apparent to one skilled in the art that various changes and modifications can be made, and equivalents employed, without departing from the spirit and scope of the invention.

What is claimed is:

1. A photographic copying apparatus comprising:

a first exposure arrangement for exposure of photographic negative or positive copy masters onto a photographic copy material, wherein said first exposure arrangement comprises a reproduction objective and defines an exposure light path;

a second exposure arrangement for exposure of screen copy masters onto the photographic copy material, said second exposure arrangement including a cathode ray tube for generating said screen copy master, and a control system for said cathode ray tube, said second exposure arrangement further comprising a color filter assembly, an objective and a mirror for directing said screen copy master emitted by the cathode ray tube to said photographic copy material, said cathode ray tube being arranged at approximately a right angle with respect to said exposure light path of said first exposure arrangement, wherein said color filter assembly, said objective and said mirror are combined as a structural unit to constitute an imaging optical system which is capable of being positioned into said exposure light path instead of said reproduction objective of said first exposure arrangement; and wherein said color filter assembly, said objective and said mirror of said second exposure arrangement are arranged in a light-fight tubus having a casing in which a light-entry window is provided, said light-entry window facing the screen of said cathode ray tube when said second exposure arrangement is in an operating position, wherein further said objective of said second exposure arrangement is arranged at one end of said light-tight-tubus, and wherein said mirror is mounted fixedly relative to the said light-entry window.

2. The photographic copying apparatus in accordance with claim 1, wherein said color filter assembly comprises color filters for the primary colors red, green, blue, which are arranged on the circumference of a filter cage that is rotatable within said tubus, said filter cage further comprising on its circumference an area, which blocks the light pass-through when facing said light-entry window.

3. The photographic copying apparatus in accordance with claim 2, wherein said filter cage comprises an additional area which, when facing said light-entry window, allows light from said cathode ray tube to pass unhindered through said light-entry window towards said mirror.

4. The photographic copying apparatus in accordance with 3, further comprising a drive mechanism which is positioned outside the tubus, said drive mechanism being capable of rotating said filter cage.

5. The photographic copying apparatus in accordance with claim 2, further comprising a drive mechanism which is positioned outside the tubus, said drive mechanism being capable of rotating said filter cage.

6. The photographic copying apparatus in accordance with claim 1, further comprising a rotatable platter-like objective carrier at a first end of said tubus, said objective carrier being capable of accommodating different objectives for different imaging scales which can be moved into said exposure light path.

7. The photographic copying apparatus in accordance with claim 7, further comprising an objective carrier adjustment drive for moving the different objectives of said platter-like objective carrier into the exposure light path, wherein a filter cage drive mechanism and said objective carrier adjustment drive are coupled to one another such that a rotation of a filter cage in a first direction causes an adjustment of said platter-like objective carrier, thereby causing a change of objectives, while a rotation of said filter cage in a second direction opposite the first direction causes an uncoupling of said filter cage from said platter-like objective carrier, such that the position of said platter-like objective carrier does not change.

8. The photographic copying apparatus in accordance with claim 7, wherein said filter cage is fixedly attached to a gear-wheel which can be coupled with a drive motor arranged within the apparatus.

9. The photographic copying apparatus in accordance with claim 8, wherein said drive motor is arranged both to drive an adjustment of the focal length of a zoom objective of said first exposure arrangement when said zoom objective is positioned into said exposure light path, and to drive said filter cage and said platter-like objective carrier, respectively, when said imaging optical system of said second exposure arrangement is positioned into said exposure light path.

10. The photographic copying apparatus in accordance with claim 1, wherein the reproduction objective(s) of said first exposure arrangement and the imaging optical system of said second exposure arrangement are mounted on an objective carousel for movement into said exposure light path and whereby an automatic change between the corresponding first or second exposure arrangement is provided.

* * * * *